(12) United States Patent
Desai

(10) Patent No.: US 10,885,891 B2
(45) Date of Patent: Jan. 5, 2021

(54) SYSTEM, METHOD AND APPARATUS FOR DIRECTING A PRESENTATION OF A MUSICAL SCORE VIA ARTIFICIAL INTELLIGENCE

(71) Applicant: Pallavi Ekaa Desai, Austin, TX (US)

(72) Inventor: Pallavi Ekaa Desai, Austin, TX (US)

( * ) Notice: Subject to any disclaimer, the term of this patent is extended or adjusted under 35 U.S.C. 154(b) by 0 days.

(21) Appl. No.: 16/873,053

(22) Filed: Jan. 23, 2020

(65) Prior Publication Data

US 2020/0175951 A1 Jun. 4, 2020

(51) Int. Cl.
*G09B 15/02* (2006.01)
*G10H 1/00* (2006.01)

(52) U.S. Cl.
CPC ......... *G10H 1/0008* (2013.01); *G09B 15/023* (2013.01); *G10H 2210/086* (2013.01); *G10H 2210/091* (2013.01)

(58) Field of Classification Search
CPC .............................. G10H 1/0008; G09B 15/023
See application file for complete search history.

(56) References Cited

U.S. PATENT DOCUMENTS

| | | | |
|---|---|---|---|
| 5,728,960 A * | 3/1998 | Sitrick ...................... | G10G 1/00 84/477 R |
| 6,084,168 A * | 7/2000 | Sitrick .................. | G09B 15/023 84/477 R |
| 7,074,999 B2 * | 7/2006 | Sitrick .................. | G09B 15/023 84/477 R |
| 7,098,392 B2 * | 8/2006 | Sitrick .................. | G09B 15/002 84/477 R |
| 7,423,213 B2 * | 9/2008 | Sitrick .................. | G09B 15/023 84/470 R |
| 7,612,278 B2 * | 11/2009 | Sitrick .................. | G09B 15/002 84/609 |
| 8,053,657 B2 * | 11/2011 | Sitrick .................. | G09B 15/023 84/477 R |
| 8,629,342 B2 * | 1/2014 | Lee ........................ | G09B 15/04 84/610 |
| 8,865,990 B2 * | 10/2014 | Minamitaka ......... | G10H 1/0008 84/609 |
| 9,412,352 B2 * | 8/2016 | Uemura .................. | G11B 27/10 |
| 9,576,564 B2 * | 2/2017 | Yamauchi ............ | G10H 1/0033 |
| 9,622,572 B1 * | 4/2017 | Moore .................. | A47B 23/004 |
| 9,697,739 B1 * | 7/2017 | Goncalves ........... | G10H 1/0008 |
| 9,767,705 B1 * | 9/2017 | Klapuri ................ | G10H 1/0008 |
| 9,852,721 B2 * | 12/2017 | Kozielski ............... | G10H 1/383 |
| 9,865,241 B2 * | 1/2018 | Colafrancesco ..... | G10H 1/0008 |
| 10,102,834 B2 * | 10/2018 | Pinuela Irsarri ........ | G10G 1/00 |

(Continued)

*Primary Examiner* — Robert W Horn

(57) ABSTRACT

Aspects of the subject disclosure may include, for example, receiving content in the form of musical score sheets or other data that includes instructions to play notes on a particular instrument, guidance that is enabled with respect to the content, obtaining new input such as musical scores or other instructions responsive to determining that the guidance is enabled, and obtaining the guidance with respect to a display of the content, where the obtained guidance is based on the input. The instructions may include the end user take certain action in playing the instrument or physical action in a marching band context. Artificial intelligence may be used to issue new documents, instructions or guidance. A GPS and drone communications system is also disclosed. Other embodiments are disclosed.

8 Claims, 12 Drawing Sheets

(56) References Cited

U.S. PATENT DOCUMENTS

| | | | | |
|---|---|---|---|---|
| 10,117,512 | B1* | 11/2018 | Moore | G10G 1/02 |
| 10,235,898 | B1* | 3/2019 | Ryynanen | G10G 3/04 |
| 10,235,980 | B2* | 3/2019 | Maezawa | G10H 1/0008 |
| 10,276,137 | B2* | 4/2019 | Noguchi | G06F 40/197 |
| 10,418,012 | B2* | 9/2019 | Katz | G10H 1/0008 |
| 2007/0051227 | A1* | 3/2007 | Gotfried | G09B 15/00 |
| | | | | 84/600 |
| 2013/0249947 | A1* | 9/2013 | Reitan | G06T 19/006 |
| | | | | 345/633 |
| 2016/0104469 | A1* | 4/2016 | Takahashi | G10G 1/00 |
| | | | | 84/609 |
| 2017/0287453 | A1* | 10/2017 | Uemura | G10H 1/0008 |
| 2018/0218204 | A1* | 8/2018 | Kasmir | G06F 1/163 |
| 2019/0237048 | A1* | 8/2019 | Yan | G10F 1/02 |
| 2020/0074876 | A1* | 3/2020 | Jancsy | G10H 1/0008 |
| 2020/0175951 | A1* | 6/2020 | Desai | G10H 1/368 |

* cited by examiner (Not to Scale)

(Not to Scale)

300

SYSTEM, METHOD AND APPARATUS FOR DIRECTING A PRESENTATION OF A MUSICAL SCORE VIA ARTIFICIAL INTELLIGENCE

FIELD OF THE DISCLOSURE

The present disclosure relates generally to the field of music and musical instrument lyres and, more specifically, to a system and method for acquiring and reading sheet music for individual musicians in bands and orchestras on reading devices which are attached via a lyre or may be placed on a stand.

BACKGROUND

As musicians understand, reading sheet music while playing in a large group (e.g., orchestra, school marching band, musical group, etc.) needs precise coordination and synchronicity. Typically sheet music comes in the form of paper sheets which are attached to the instrument via a lyre where the score of a particular musical instrument is provided which must be read by the musician and manipulated to match the score as it grows in length. Thus, a musician has to turn pages manually which are typically placed on a lyre or a music stand while the score is played. In addition, the musician cannot afford to lose the place in the score which the whole band or orchestra is playing. This movement and manipulation by the musician can be cumbersome, particularly, while a musician is performing in a marching band or the like, or even in an orchestra with a fast-paced score. In addition, the music sheet is often annotated by the musician via a stylus (compartment) with respect to that instrument and reminders via a highlighter or pen markings. This is all done manually by each musician as needed.

A typical music lyre is one that is described in U.S. Pat. No. 10,117,512 issued to Moore. The teaching by Moore describes a saddle assembly having a shape approximately matching an outer profile shape of a top portion of an instrument to securely attach the music lyre to the musical instrument; the saddle assembly securely holding a music sheet assembly to retain music sheets.

BRIEF SUMMARY OF INVENTIONS

Aspects of the subject disclosure, teachings, and embodiments include, for example, receiving content in the form of musical score sheets or other data that includes instructions to play notes on a particular instrument, instructions, guidance or indicators that are enabled with respect to the content. Obtaining new input such as musical scores or other instructions responsive to determining that the guidance is enabled; and obtaining the guidance with respect to a display of the content, wherein the obtained guidance is based on the input. Such input may also be synchronized with the conductor or an assistant and the user (musician) and indication thereof. Also disclosed is providing feedback to a user of the display device on playing level or tuning of the instrument. The instructions may include the user take certain actions in playing the instrument or physical action (movement) in a marching band context. Artificial intelligence (AI) may be used to issue documents, instructions, guidance or other indicators. AI may also be used to conduct telemetric assessment between the conductor and the user musician. AI may also be used to provide instructions and guidance to a musician in a marching band to make certain movements in a band performance. Movement of the marching band may be synchronized among many participants using a global positioning communications system or alternately using a drone to relay movement, position, and synchronization among marching band participants. Computer instructions and logic are provided herein as exemplary embodiments. Other embodiments are disclosed.

DETAILED DESCRIPTION

Figure 1A:
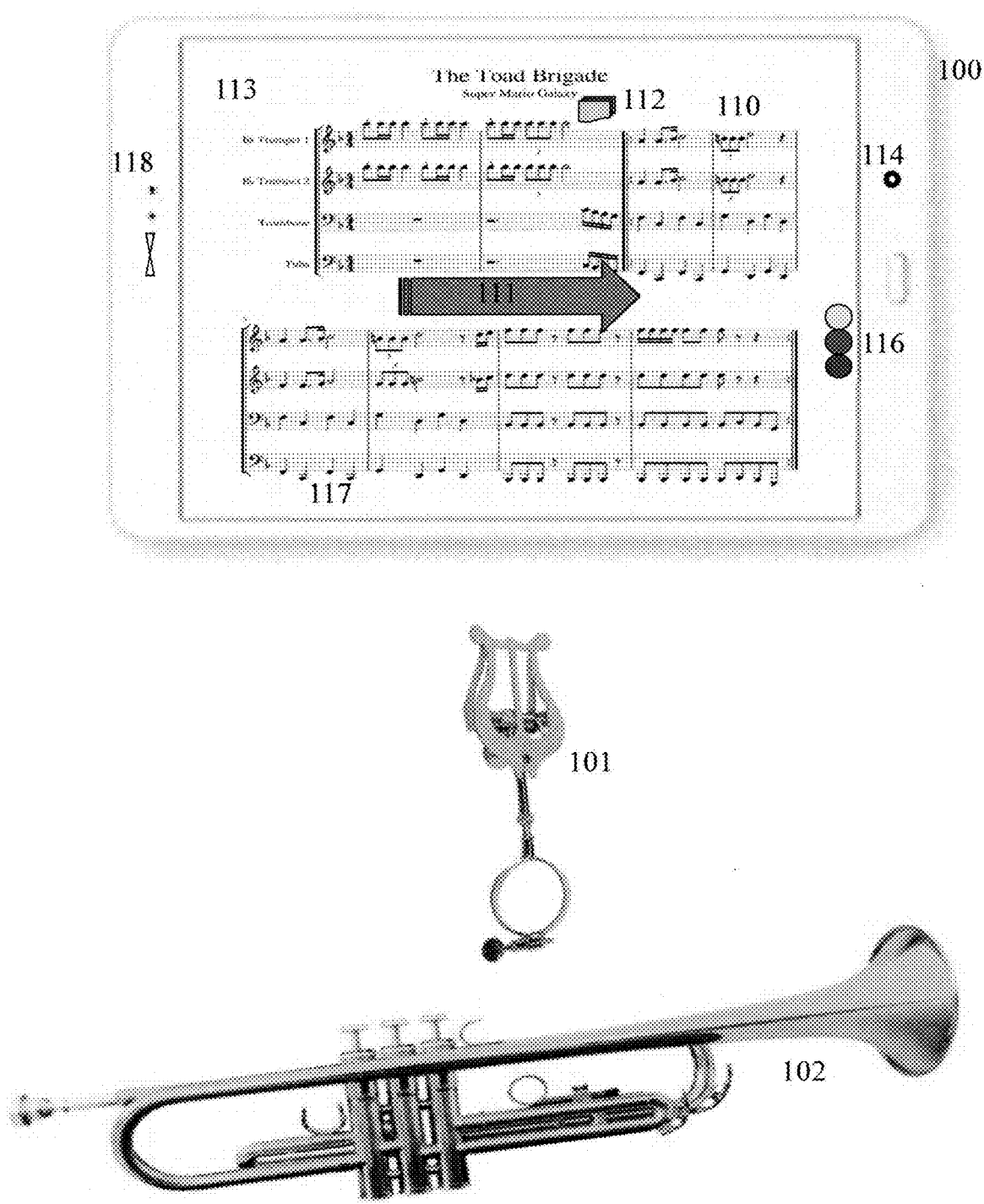
FIG. 1A discloses a music lyre holding a music score sheet on a display device 100 as attached to a typical instrument 102 using an attachment device 101.

Embodiments in accordance with the present disclosure provide a system and method for acquiring and reading sheet music for individual musicians in bands and orchestras on reading devices which are attached via a lyre or may be placed on a sheet music stand.

Marching band and orchestra musicians have a strong need for instantaneous communications with the conductor, as to the musical score, which may be distributed in near instantaneous manner to a large number of musicians playing a wide variety of musical instruments.

The current methodology is manual distribution of paper sheets sorted and collated to fit each instrument and musician. This process of distribution is entirely cumbersome and inefficient. For example, a considerable amount of time is required to print out numerous sheets of music, coordinate them, and issue them to each instrument section and each part within each section. It takes hours of work copying, sorting, collating, and filing (in proper order) by a musician on a holding assembly or file folder for each musical score. When a band or orchestra plays a number of scores, the work and organization only multiplies. In addition, these music sheets are later discarded which is harmful to the environment.

From a cost perspective, the band or orchestra administrators make the decisions on music scores, varying them as needed for each performance. Typically, musical score do not remain the same for performances. For example, marching bands play different and varying music at each sporting event on a week to week basis. Each musical score is chosen by the music conductor and distributing them to the musicians. The music administration has a certain budget to stay within for each performance including timing and length of music, practice of scores, and paper distribution of musical scores. Thus, for performances with limited budgets and personnel, it is extremely limiting to vary the performances in venues such as middle and high schools. Each band may have musical equipment, uniforms, i.e., a class set and rent it out to their students for the year to recoup the costs and that way the senior class can just give theirs back to be used with incoming freshman. They can be resold or repurposed for another student each year.

It will be appreciated that use of the term music sheet in the subject disclosure is intended to mean a sheet which can contain the musical composition and notes to be played by a musician for a particular instrument. Accordingly, in the subject disclosure the terms music sheet, or musical score sheet, or sheet music, or the score may be used interchangeably to mean the same item.

The teachings of this disclosure are intended to overcome these limitations and restrictions by providing a system and method of music sheet delivery to a variety of musicians in large bands and orchestras via a low cost, light weight sheet music display which is connected to a network server storing a myriad of musical compositions. The display device 100 may be attached to the instrument because it is a lightweight device using a lyre. Alternately, the display device may be attached to an arm of the user using a coupler that will be available to the musician. Alternately, the display device 100 may be placed on a music stand 104 and attached thereto using suitable couplers 115. The display device 100 is also connected via a network to a conductor's devices such as a laptop, desktop or other such general-purpose computing device. The display device 100 can overcome conventional techniques that rely on paper copies of music scores, manual administration of such paper copies, and the organizational costs generally associated with such manual administration.

Another aspect of the teachings of this disclosure is that this system and method reduces the chance of students (or other types of users) losing music sheets due to irresponsibility or weather damage to the sheets which is a major problem in most marching bands. Typically, music is chosen by the conductor through a library of musical scores which are typically stored in a library on a desktop computer or a local school or musical organization server or in the cloud via public cloud storage. In an embodiment of the subject disclosure, a musical conductor and his/her associates can select musical scores from an electronic depository (e.g., an electronic storage device) and distribute music score selections via wired or wireless connectivity to each display device 100 of each musician according to the instrument being played. For example, a musical score sheet 110 for a flute is different from percussion. Thus, using this methodology, customized music sheets are quickly and efficiently distributed electronically to each musician regardless of musical instrument.

An additional feature of this teaching is synching electronic musical sheets 110 to each display device 100 of each musician and obtaining a confirmation that the correct electronic musical sheet is ready for musical play, even just prior to performance. In typical high school bands, there are always a small number of students that leave the right musical score paper sheet at the home or misplace the order of the paper musical sheets prior to the performance. This generates a terrible inconvenience for the band conductor and administrators who have to rush to help the student find the correct music sheet. To avoid such limitations prior to a music performance, each display device 100 is equipped with a synchronization indicator on the display device 100. For example, a green light 116 giving a stamp of approval to the user device means "all systems go" and the student or user is ready to play the correct music sheet. It will be appreciated that other indicators (e.g., icons, text message, etc.) can be used to indicate when a display device 100 has been synchronized. In certain embodiments the display device 100 can be configured to communicate with a source device (e.g., a server, cloud system) providing the musical score over a wired and/or wireless network to determine when a transmission of the musical score to the display device 100 has completed and thus assert a synchronization indicator such as the green indicator 116 giving a stamp of approval to the user. While synchronization is in process the display device 100 can be configured to set the indicator 116 to yellow to indicate a transmission of a music score is in process. When synchronization has not been initiated by the display device 100 or the display device 100 is unable to communicate with the source device, the display device 100 can be configured to set the indicator 116 to red indicating a stamp of disapproval telling the user to make a correction.

In other embodiments, synching between the display device 100 and the server can representing a verification that the musician has selected a proper music score. For example, the synching and affirmation of the correct musical sheet can be done at any time prior to or during the performance. Synching to the correct music score sheet document or file is done by the display device 100 communicating with the server or desktop or cloud to determine if the correct music sheet is appearing on the display device 100. This is accomplished by the display device 100 sending back to the server a score sheet identifier associated with a music score selected by a user of the display device 100 for the particular instrument to be played by the user. If the correct sheet 110 is identified by the remote server, then a green light 116 is displayed giving a stamp of approval. If the incorrect sheet is displayed, a red light 116 indicating a stamp of disapproval appearing on the display device 100 indicating to the musician that an incorrect sheet is displayed. Alternately, if the correct sheet is displayed but on the wrong page, a yellow light 116 can be shown indicating a stamp of caution to make further corrections or adjustments. Under these circumstances the musical sheet 110 can be changed manually by the musician (by selecting a new score, different page, or otherwise via user manipulation of a user interface of the display device 100) or automatically by the server responsive to a music sheet 110 request submitted to the server after the user selects a synch button presented by the display device 100 which facilitates correction by the server of a music sheet number previously displayed by the display device 100. In an embodiment in which the user manually selects the correct sheet 110, the corrected sheet 110 can be stored and obtained from a storage device in the display device 100 which can be arrange music sheets in order of dates, score types, names, or any data storage mechanism suitable for the subject disclosure.

Another feature of the teachings here includes the ability to download from a server (or cloud equipment) the music scores for the entire music season or school semester so diligent students can work ahead on musical scores for the upcoming weeks. Again this is accomplished by having software executed by the display device 100 that can make the request to the remote server to deliver the entire music library for the season or period as needed.

Another feature of this teaching includes the ability for a person (e.g., a conductor) to adjust one or more music sheets 110 on the fly and distribute the updated one or more music sheets to display devices 100 used by members of the orchestra by having the remote server wirelessly distribute the new musical score to each display device 100 of each musician prior to a performance. The changes may be highlighted 117 by the conductor (e.g. color highlights, annotations, etc.) alerting each musician of the changes. Thus, sheet music 110 may be changed easily and then distributed with the push of a button for prompt delivery to the intended end user(s).

Another feature of this teaching includes the ability to highlight 112 the musical score sheet 110 with particulars that the conductor would like to have emphasized so that the musician plays the musical note as intended by the conductor. The conductor may make changes and highlight 117 to the musical score sheet on his or her laptop and have it distributed to the server 107 where it may be stored until needed. The conductor may highlight 117 the music sheet with different colors to code for different notations or alternately use any other convenient notation.

Another problem that a musician may encounter using the apparatus of this teaching is not having proper charge prior to the musical performance. Thus, the teaching here provides a method to charge the display device 100 well in advance of the performance, for example overnight prior to the performance date. Thus, the teaching provides a low battery warning system 118 to warn the student or musician a musical note to remind that the display device 100 needs to be charged, for example, at 9 pm each night. The teaching of the charge reminder will use the operating system timer to synch with the display device 100 battery charge indicator 118 to determine the amount of remaining charge. A power switch 118 to turn on and off the display device 100 is also provided on the device 110, which may be virtual or physical.

The teaching here further provides a display device 100 that synchronizes musical score sheet 110 with music being played and thus no manipulation is needed to turn pages on the screen. This is accomplished by software on the device that recognizes notes being played and follows the music sheet 110 notes to adjust the pages as the notes come to the bottom of the page. Further, the software provides a notation on the screen display as to where the note is currently standing with a highlighted mnemonic such as a highlighted dot or symbol 112 that follows the notes as it is played. This is accomplished by the device 100 having a microphone 104 that listens and conveys the sound to the application running on the device which is then translated into a note and synchronized with the notes on the musical score sheet 110 being displayed.

Further the teaching also provides for dynamic synchronization of the entire score sheet 110 for all musicians with the conductor's sheet, if conductor decides to change it on the fly. This is accomplished by having the conductor's laptop or other microprocessor device 106 talking to the backend server which stores all musical sheets. As the changes are made by the conductor, the changes are transmitted to the corresponding musical sheets 110 as they are applicable. The changes are then transmitted to each musician's display device 100 wirelessly.

Another feature of this teaching provides artificial intelligence algorithms that receives data on the notes being played by the musician and dynamically determines which notes are being correctly played. Thus, artificial intelligence is used for practice performance evaluation to see if notes are hitting the right chords, telling musician if notes are played correctly. Additionally, the pace of the performance is kept track of so the musician may speed up the playing or slow it down. This may be accomplished in manner similar to described hereto before with highlighted dots or symbols 112 being displayed as the music is performed.

Additionally, the display device 100 may include an appropriate microphone 114 and software that provides tuning information as the instruments tuning condition. Thus, for example, if the instrument is out of tune, the display device 100 will provide an indicator that tells the musician to tune his or her instrument. This may also be accomplished during the performance itself, giving a signal about instrument tuning condition. The musician may then tune the instrument on the fly during the performance. Also conductor can ask a particular musician to tune their instrument because the out of tune indicator may also be transmitted to the conductor's device telling him certain instruments are out of tune. This may be sent to an assistant conductor rather than the primary conductor if it is too distracting during the performance.

Additionally, an artificial intelligence (AI) algorithm may be used to monitor various sections of the orchestra to adjust their playing style, tempo or other criteria based on conductor preference by having the AI send a signal to conductor to adjust the particular section. The conductor with his/her baton may then issue a command for the entire section to adjust as needed.

Another teaching provides for a backside screen 200 on the display device 100 can emit various colors during marching band performance. The backside screen 200 may also enhance orchestra concerts for pop festivals, holiday celebrations, and national holidays to create various motifs 201. For example, Christmas colors, flags. Thus, the display device 100 has two screens: one for the musician to read notes 113 and the other on the backside 200 of the display device 100 to display images, colors, flashing colors, movement on the screen 200. Together, all the display devices 100 may then be used to display synchronized color display 201 to the audience of the performers in synchronization with the music being played. This is accomplished by the server 107 issuing display images 201 according to each section or musician to produce a harmonious display. The images 201 on the displays 200 are wirelessly received live during a performance from the server 107 or other such computer processor, or alternately stored on the display devices 100 and activated upon the conductor's or an assistant's or a lighting coordinator's indication, manually or by a single notification to all the display devices 100.

The teaching here also provides for marching band movement instructions. Thus, for example, the front side of the display screen 113 may provide direction of movement for the musician with the assistance of an arrow 111 displayed momentarily on the display screed to, for example, turn right or left, or circle, or jump or perform any time of human movement in a particular manner. This is accomplished by synchronization software instructions stored or delivered live wirelessly to the display device 100 for marching band synchronization. The synchronization may also be accomplished by the display device 100 having a global positioning system (GPS) 108 communicating with a display device receiver to identify the exact location of the marching band member. Upon determining the GPS position, marching band movement directions or instruction may be provided to the musician via a presentation of images on the display device 100 (arrows, text instructions, etc.). Alternately, an approximate, but reasonably precise location of each musician may also be coordinated for the marching band using a drone 109 that may be flying above, thus providing precision movement. The drone 109 emitting a signal which is read by the GPS receiver on the display device may then be used to calculate an approximate, but reasonably precise location of the musician and marching instructions be provided thereafter.

The teachings provide here for a display device 100 that is a very light weight, durable display with a basic processor, memory, storage and long life battery as describe hereafter. The battery is intended to have sufficient charge to last at least an average performance period. Accordingly, the battery may be of a lithium or other such variety.

Current conventional stands tend to be large for holding two sheets of music blocking view of the musician. Because of the screen size 113, 200 of the display devices 100, the stands in an orchestra can be of small size thus making the musicians visible.

In an embodiment of the present disclosure, a computer-readable storage medium in a service management center (SMC) 107 comprising a processor and memory of a general-purpose computer that manages operations of a plurality of display devices 100 and a lap-top or other similar computer processor 106 issued to the conductor. The storage medium of each display device 100, SMC 107, conductor device 106 have computer instructions for enabling a selection of one or more musical score sheet 110 display services on each of a plurality of display devices 100 according to a single identification reference supplied by an end user display device 100 to enable any of the musical services of the service management center 107.

The operating system for the display device 100, conductor device 106, or SMC server 107 may be any open source operating system such as Android, Linux, or alternately a proprietary operating system such as Apple iOS, Microsoft CE, and such other ones. The display screen 113 may be changed to dark mode as necessary if performance so requires. Likewise the server 107 and conductor device 106 may be equipped with suitable operating systems and applications that operate for the purposes of these teachings.

The SMC 107, in communication with a plurality of display devices 100, supplies services to a corresponding plurality of display devices 100, and a conductor device with may be used as a controller for managing operations thereof. The controller can be programmed to receive from a select one of the devices an identification reference in response to a request for service by an end user musician, search for one or more services associated with the identification reference, select from the search results one or more services appropriate for the requesting device, and enable the one or more services on the selected device.

In another embodiment of the disclosure, a computer-readable storage medium in a select one of a plurality of devices has computer instructions for acquiring access to a select one or more services from the SMC 107 on the selected display device 100 according to a single identification reference transmitted by the selected display device 100.

FIG. 1A is a diagram of a typical display device 100 mounted on a musical instrument. The display unit displays the composition 110 and notes for the corresponding musical score. The notes is annotated with a highlighted symbol 112 which follows the notes as they are played. Additionally, an arrow 111 momentarily appears instructing the marching band member to turn right as it flashes. FIG. 1 also shows an attachment device which couples the display device 100 to the instrument 102. The attachment 101 should be rubberized to avoid scratches on display unit 113. The attachment unit 101 should also be of a nature to sturdily hold the display device 100 to the instrument 102 or alternately using a conventional arm musical lyre or holder which attaches the display device 100.

Figure 1B:
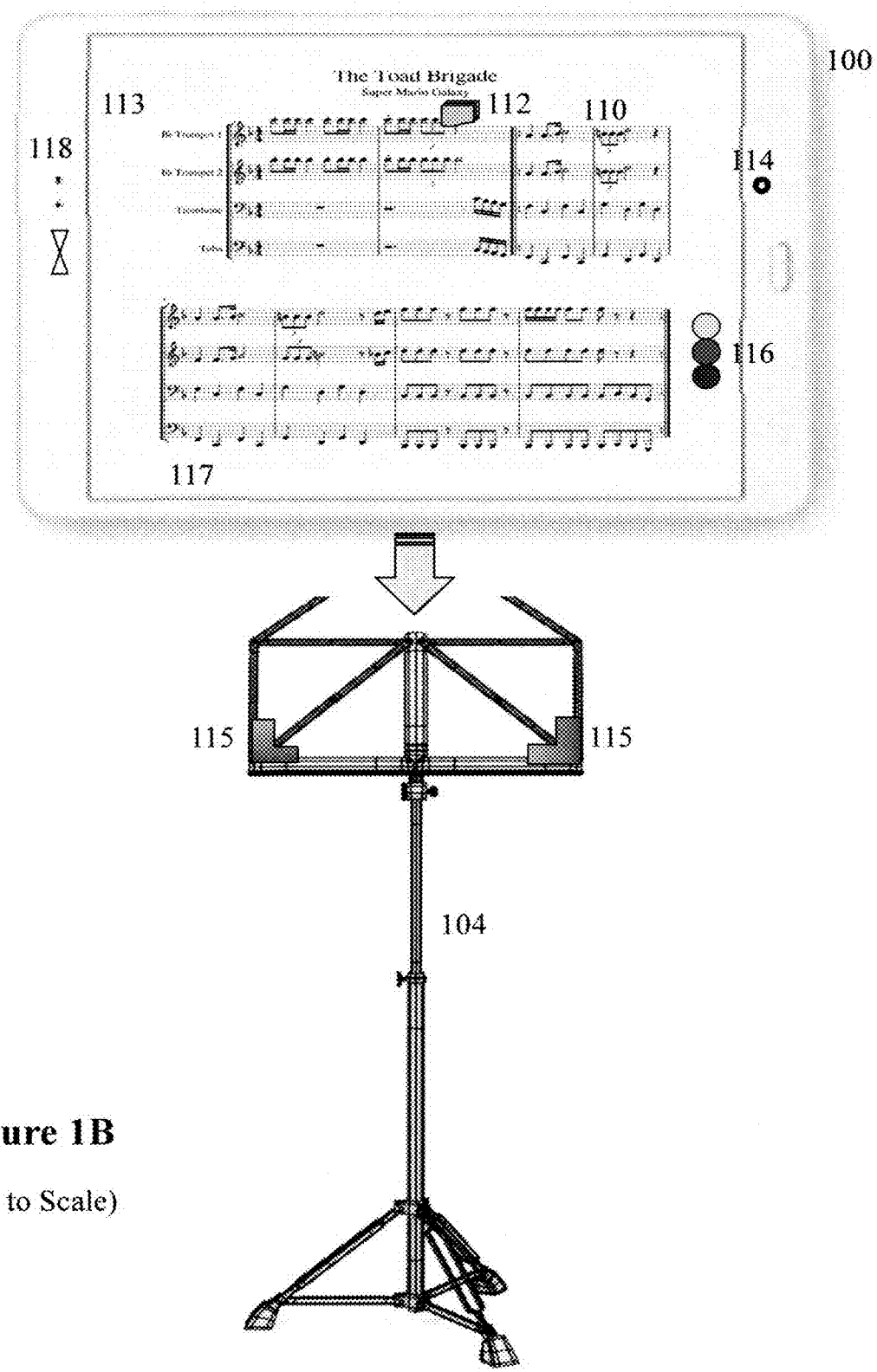
FIG. 1B discloses a music score sheet on the display device 100 as displayed on a music stand 104 for stationary applications on stand.

FIG. 1B is a diagrammatic representation of the display devices 100 placed on a music stand in front of the musician in an orchestra setting. The stand include a rubberized attachment mechanism to hold the display in place. The rubberized attachment holds the display device in firm grip while avoiding scratches on the display screen of the display device 100. In addition, the backside of the display device includes rubberized stickers 202 to avoid scratches on the backside display unit 200 while placed firmly on the stand.

Figure 1C:
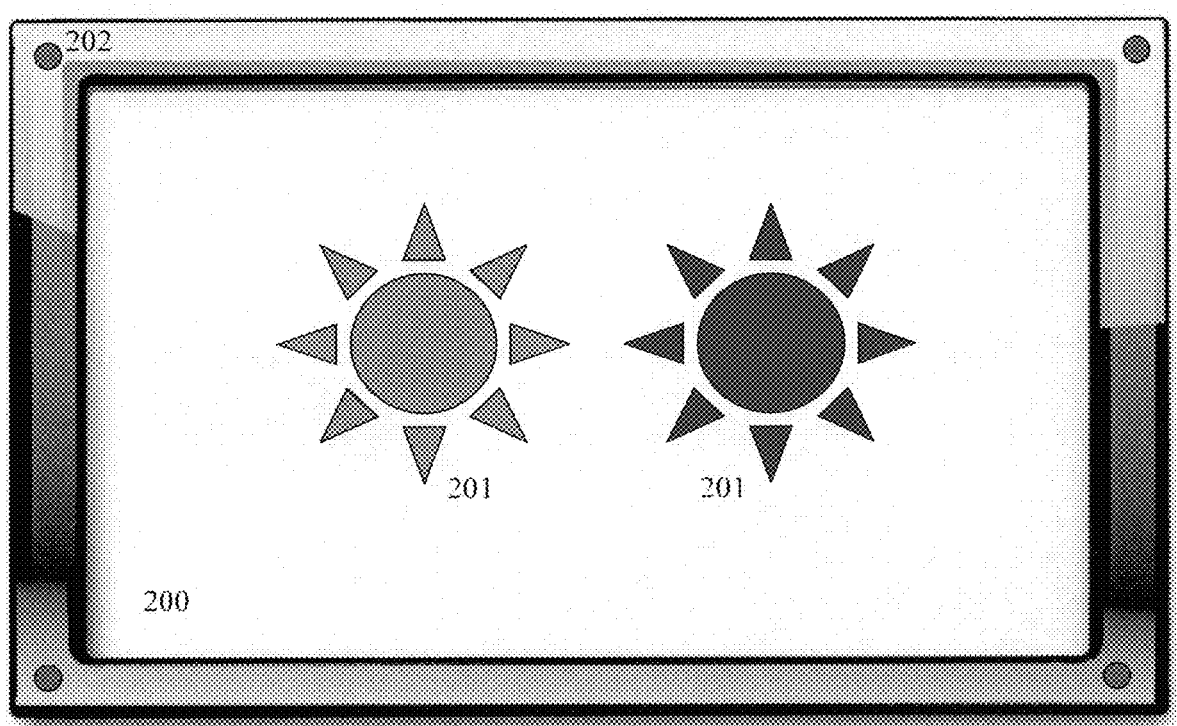
FIG. 1C discloses a backside display 200 of the display device 100 as part of the system for distributing musical score sheets 110 according to the teachings of the present disclosure.

FIG. 1C discloses a backside display 200 of the display device 100 as part of the system for distributing musical score sheets 110 according to the teachings of the present disclosure. The display unit 200 may of the same type as on the front-side 113 or of another type of a lower resolution to primarily display colors and images.

Figure 2:
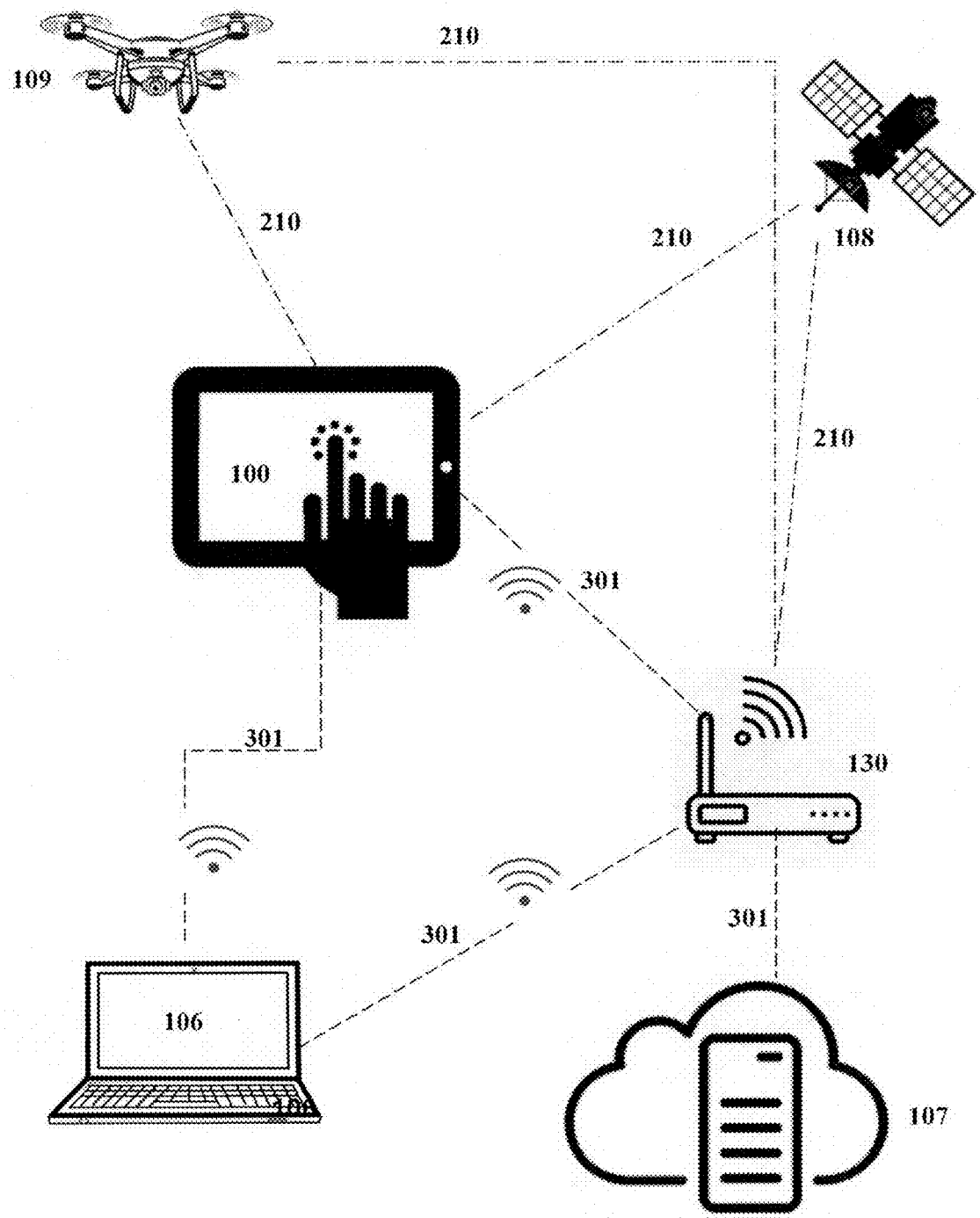
FIG. 2 discloses a non-limiting exemplary embodiment for a system for distributing musical scores to band or orchestra participants including the display device 100, a server 107, and a conductor's device 106.

FIG. 2 is a diagrammatic representation of the machines in the form of various computer processor systems 100, 106, 107 and others within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The SMC 107 comprises one or more service centers 107 in synchronous communications such as a distribution of musical score sheets 110 and other orchestra instruction and performance instructions to the display device 100, to the conductor device 106 and vice versa, i.e., the reverse communication is also intended. Thus, a display device 100 may request additional information and data from the SMC 107 or conductor device 106. A display device 100, conductor device 106 or SMC 107 may also be in communication with a GPS 108 or drone tracking system 109 to identify the location or near-exact location of the display device 100 in a marching band performance. Display device 100 may also be communication with another display device 100 or to a plurality of display devices 100 via Bluetooth or via a wireless communications service center, just to mention a few. Each of the service centers is coupled by landline or wireless communication means to the conductor devices 106 or an assistant conductor devices that manages the SMC 107. The conductor devices and the SMC can be a scalable server with one or more databases managed by applications such as a music score sheet delivery system, lighting show 201 via a synchronized lighting delivery software for the backside display 200 of the display device 100. Although the SMC 107, conductor device 106 are shown separately, it would be apparent to one of ordinary skill in the art that portions of the service centers 107 can be integrated with each other and the controller 106. The conductor device 106 and SMC 107 can thus be programmed with each of the services discussed above or references available to the end user display device 100.

The wireless communications service center not shown in diagrams is a typical IT wireless communication system conventionally available across the world today and can support common wireless services such as cellular communications, dispatch services, WiFi, and/or WiMax, LTE, 5G or other such generations of wireless communications. Connectivity between the devices 100-109 and the SMC 107 can be accomplished by way of a wired and/or wireless communication link 301 to a communication system. The communication system can utilize circuit-switched or packet-switched network technology, or combinations thereof. As a hybrid system, the communication system can support disparate communication technologies such as cellular (or any generation thereof), WiFi, WiMax, landline, or optical communications. Each of the aforementioned SMC 107 can therefore provide by way of the communication system interactive two-way communications, or passive services that terminate at any of the devices 100, 106, and 107 accessible to an end user, conductor, assistant conductors, lighting assistants and coordinators, marching coordinators with each such coordinator have their own device to relay communications to the musician performer.

For additional security, the conductor or other coordinators may proceed issue instructions such that it restricts access to the one or more services requested according to a security policy. This step can be used, for example, when the end user requests for service(s) musical score sheet 110 on a display device 100 not belonging to him/her, thus further eliminating the possibility of an unsubscribed user gaining access to service indefinitely. The security policy can dictate, for example, a limited period of use of the requested service. In the case of downloaded multimedia content such as score sheets 110, the policy can be attached to such content. The policy can also provide a limited period of use, a restriction to forward or copy content, and/or other common copyright restrictions.

It would be apparent to one of ordinary skill in the art that the functions operating in the SMC 107, controller device 106 or display device 100 or drone 109 can be modified in part so that they operate to provide methods describe in the disclosure here. Accordingly, said modifications can also be considered to be within the scope and spirit of the claims described below.

The machines described in these teachings may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system of 106 and 107 may include a processor (e.g., a central processing unit (CPU), a graphics processing unit (GPU, or both), a main memory and a static memory, which communicate with each other via a bus. The computer system may further include a video display unit (e.g., a liquid crystal display (LCD), a flat panel, a solid state display or other such displays). The computer system may include an input device (e.g., a keyboard), a cursor control device (e.g., a mouse), a disk drive unit, a signal generation device (e.g., a speaker or remote control) and a network interface device. Similarly, the display device 100 would include the same with the exception of a physical key board or a physical cursor control but instead have a virtual keyboard and cursor control via a touch screen capability that is conventional in the arts.

Thus, an exemplary embodiment presented and operated in this disclosure includes a display device 100 that may be coupled to a musical instrument 102 using a lyre or other coupler 101, which comprises a processing system 400 including a processor 404; and a memory 406 that stores executable instructions 430, 432, 434 that, when executed by the processing system 400, facilitate performance of operations. The operations may comprise providing user feedback 112, 116, 118 from the display device 100 in response to a playback of a musical score 110 containing musical notes during a first timeframe of the playback of the musical score 110, wherein the musical score 110 includes musical score annotations or note changes 117. The user feedback is obtained from a microphone 114 in the display device 100 capturing the notes played by a nearby musical instrument 102; and receiving guidance information from a conductor's computing device 106 based on the user feedback. Such guidance may take a myriad of forms, from a letter grade on the user's ability, to play the instrument to body form, to increasing to decreasing playing dynamics. Additionally, other feedback of any kind can be provided. For example, a user's playing ability may be graded on the fly in a live manner getting immediate feedback to the user to adjust playing the instrument in different dynamic or even tune an out of tune instrument. The guidance information is associated with a second timeframe in the playback of the musical score 110, and wherein the second timeframe is subsequent to the first timeframe in the playback of the musical score 110.

The operations further comprise receiving an input 301 responsive from a conductor's computing devices 106 or a server 107 to a determination that a guidance feature 116 is enabled with respect to the musical score 110, wherein the input includes a timestamp associated with the playback of the musical score 110. The guidance information may be further based on the user feedback and use of artificial neural network to compare notes obtained from the user's musical instrument 102 with notes stored in a server 107 to determine if the playing of the instrument 102 by the performer needs to adjusted, or if the performer or user is falling behind on notes displayed on the musical score 110. The artificial neural network is located in a remote or nearby server 107 which may be used for training recognition of musical notes. The artificial neural network may comprise a processing system 402 including a processor 404; and a memory 406 that stores executable instructions that, when executed by the processing system 402, facilitate performance of a number of operations. For example, the operations may include receiving, via processing circuitry 402, input data 301 responsive to an example musical note performed from the displayed musical score 117; generating, via the processing circuitry 402, a sequence of data blocks based on a cepstral analysis of the input data 301; adjusting, via the processing circuitry 402 and utilizing a matrix inversion, weight values corresponding to a number of neuron circuits of the artificial neural network when the number of the neuron circuits is equal to the number of the data blocks; and adjusting, via the processing circuitry 402 and utilizing a least-squares estimation, the weight values when the number of the neuron circuits is not equal to the number of the data blocks. The operations may further comprise: receiving an input 301 responsive to a determination that a guidance feature 116 is enabled with respect to the musical score 117, wherein the input 301 includes an indication of a note in the musical score 117 that is of interest, an object 112 in the musical score that is of interest, a particular page in the musical score that is of interest, or a combination thereof, and wherein the guidance information is further based on the user feedback.

Further operations may include obtaining an input 301 responsive to a determination that a guidance feature 116 is enabled with respect to the musical score 117; determining a location of the display device 100 using global positioning system (GPS) receiver 616 in the display device 100 in communication with a satellite 108 or a drone 109; and determining a time and a date, wherein the input 301 includes the location, the time, and the date; and issuing instruction to the user to take corrective action using artificial intelligence to correct the position of user in a marching band with respect to other band members or as mapped out and stored in the server 107 and user feedback from their respective display devices 100 using GPS radio 616. Additional operations include obtaining an input 301 responsive to a determination that a guidance feature 116 is enabled with respect to the musical score 117, wherein the input 301 includes an indication of a note 112 in the musical score that is of interest, an object 112 in the musical score that is of interest, a particular page in the musical score that is of interest, or a combination thereof, and wherein the guidance information is based on the input 301 from the microphone 114 requiring user to take corrective action with respect to the musical instrument 102. Additional operations include identifying an object 112 included in a musical score data base 107 as a selectable item; receiving a selection of the object subsequent to identifying the object as the selectable item; and responsive to receiving the selection of the object, performing at least one of: presenting a new annotated musical score 117 with the musical note changes 112; and presenting the musical note changes with a highlighted marking 112.

Another exemplary embodiment includes a marching band or orchestra delivery system having a machine-readable medium having therein executable instructions that, when executed by a processing system 402 including a processor 400, facilitate performance of a number of operations. For example, one operation would be presenting at least a portion of a musical score 117 on a display device 100 having a display 113; while providing feedback from the display device 100 to a server 107 or a conductor's computing device 106 in response to a playback of musical score 117 containing musical notes 112 during a first timeframe of the playback of the musical score containing GPS coordinates identifying a near-exact location of the user using a satellite 108 or a drone 109 having GPS communications capability 210; and presenting the guidance information on the display device 100 received from the server 107 or the conductor's device 106, wherein the guidance information includes navigation information 111 for enhancing a user's navigation during a marching band performance, and wherein the guidance information includes an icon 111 (for example, in the form of an arrow) overlaid on top of the portion of the musical score 117. The icon 111 provides a navigation direction, a navigation speed, or a combination thereof to the user, to arrive at a scene, an object, a location, or a combination thereof, during a playback of the musical score 117. The icon is intended to identify a navigation path via the arrow to the scene (for example, in the middle of the field), the object (for example, as dotting the "i" by the Ohio State University band, the location (for example, toward the end of the field), or the combination thereof.

Another set of operations the above embodiment may include where the musical score 117 includes a tag, and wherein the tag identifies a second object (not shown) included in the musical score 117. Thus, based on the tag, identifying the second object as a selectable item on the display device 100; receiving a selection of the second object subsequent to identifying the second object as the selectable item on the display device 100; and responsive to receiving the selection of the second object, performing at least one of: presenting a new annotated musical score 117 with the musical note changes 112; and presenting the musical note changes 112 with a highlighted marking.

The computer instructions provided in the above example where the icon identifies the navigation direction and the navigation speed for each marching band member may use an artificial neural network to achieve the goals of such navigation. The icon may be solid or translucent or it may be flashing giving the user navigation direction. The artificial neural network may comprise, for example, a plurality of input circuits, each configured to store corresponding input data; a plurality of neuron circuits, each neuron circuit having a plurality of neuron inputs, wherein each neuron circuit is configured to generate a neuron output based on one of a plurality of functions, and wherein each of the plurality of functions is proportional to a product of each of the plurality of neuron inputs raised to a power of one of a plurality of constants; a switch configured to distribute the corresponding input data from each of the plurality of input circuits to selected ones of the neuron inputs of selected ones of the plurality of neuron circuits; and a summing circuit configured to generate output data based on a sum of the neuron output from the plurality of neuron circuits and distributed toe each respective marching band member.

The method described above may also include transmitting, via a processing system 402, additional guidance information associated with a playback of a musical score 117 at a user display device 100 wherein the second guidance information turns on the back side 200 of the display device 100, and presents a choreographed effect 201 in concert with other display devices 100 located near the user.

Some of the embodiments described herein, s described above employ artificial intelligence (AI), including artificial neural networks, to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

The computer instructions may also provide for artificial intelligence which gathers data from any of the devices describe in the disclosures here, analyze such data, and decipher further actions to be taken in a calculated manner via pattern learning, machine learning including statistical learning and deep learning, neural networks, image processing and computer vision, CNN or other AI technologies as is available in the art. Such actions may include, for example, determining the location of the marching band member and predicting when to issue instructions to turn right or left or other synchronized movement. Another example is determining from the microphone 114 data on the notes being played by the musician performer and providing additional instruction on the display unit for actions, such as speeding up playing the notes to catch up with the rest of the orchestra or band. AI may also be used to create various effects on the backside display 200 to create a random display of images dependent on the quality of the notes being played by the musician. It is clear to one skilled in the art of AI that AI may be implemented to perform any number of tasks in an orchestra, and examples provided above are not by way of limiting the capabilities of AI applications in the teachings provided herein.

And now an exemplary method is disclosed here for accomplishing the goals of this disclosure. Thus, for example, a method is provided comprising transmitting, by a processing system 402 including a processor 404, first guidance information associated with a playback of a musical score 117 at a user display device 100. The processing system receives feedback 301 from the user display device 100, wherein the feedback is based on the first guidance information; and by the processing system 402, transmits second guidance information associated with the playback of the musical score sheet 117 at the user display device 100 in accordance with the feedback 301, where the second guidance information is different from the first guidance information. For example, the second guidance information may include a specification of a reference marker associated with a current position of the user relative to another user in a marching band. Additionally, the second guidance information may include a specification of a navigation direction 111 and a navigation speed relative to the reference marker to arrive at a scene on a marching field, an object on the marching field, a near-exact location of the user on the field, or a combination thereof, some of which has been described previously. Additionally, the method may include where the musical score includes a tag identifying a second object included in the musical score 117, and the method further comprises, based on the tag, identifying the second object as a selectable item on the display device; receiving a selection of the second object subsequent to identifying the second object as the selectable item on the display device; and responsive to receiving the selection of the second object, performing at least one of presenting a new annotated musical score 117 with the musical note changes 112; and presenting the musical note changes with a highlighted marking.

A method described above may also include methodology for training an artificial neural network that implements recognition of musical notes being played. Thus, for example, the method may comprise receiving, via processing circuitry 402, input data 301 responsive to an example musical note being performed; generating, via the processing circuitry 402, a sequence of data blocks based on a cepstral analysis of the input data 301; adjusting, via the processing circuitry 402 and utilizing a matrix inversion, weight values corresponding to a number of neuron circuits of the artificial neural network when the number of the neuron circuits is equal to the number of the data blocks; and adjusting, via the processing circuitry 402 and utilizing a least-squares estimation, the weight values when the number of the neuron circuits is not equal to the number of the data blocks.

Figure 3:
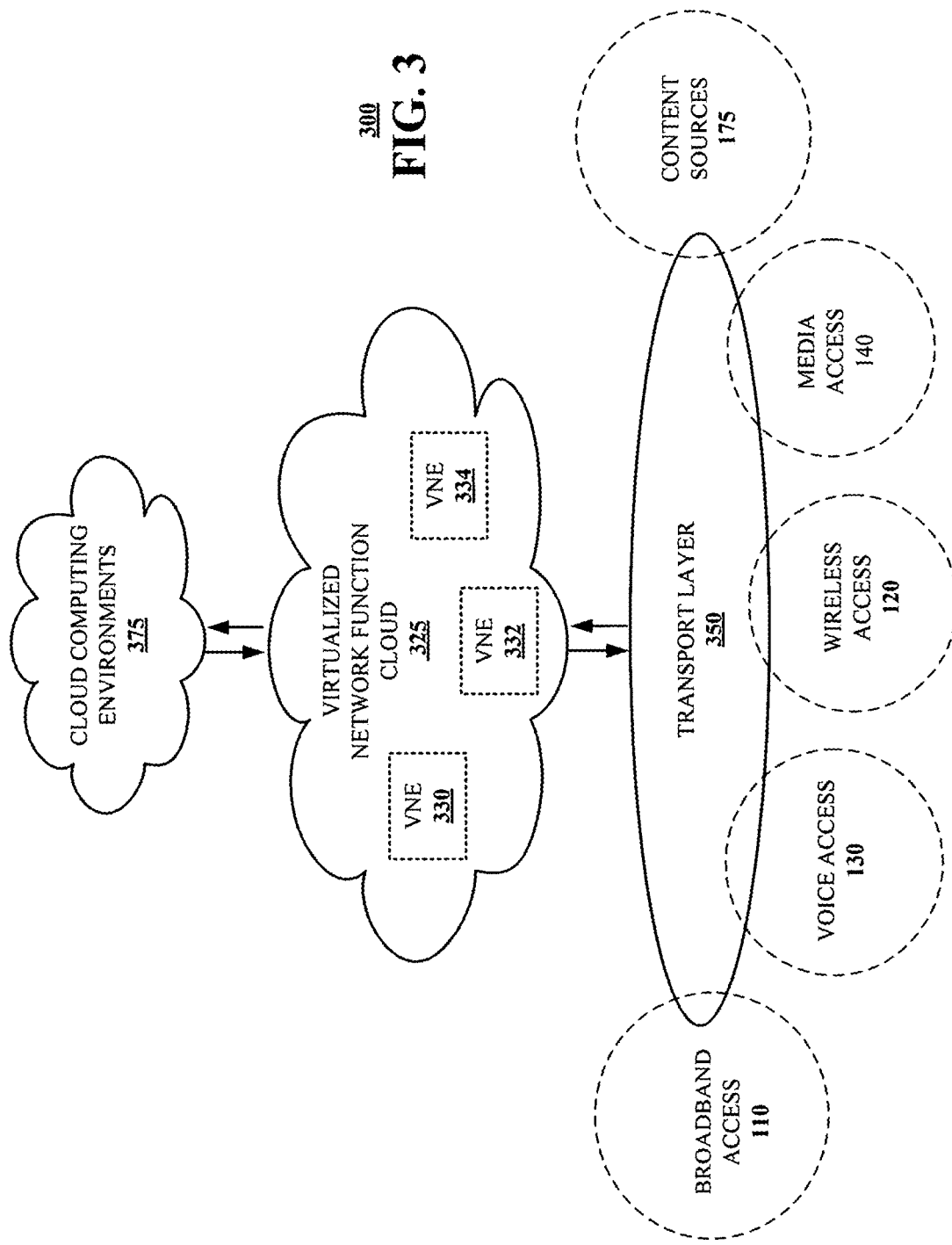
FIG. 3 is a block diagram illustrating an example, non-limiting embodiment of a virtualized and/or cloud communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 301 (shown in FIG. 2A), the subsystems and functions of system, and the methods presented in FIGS. 7-10.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 170, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
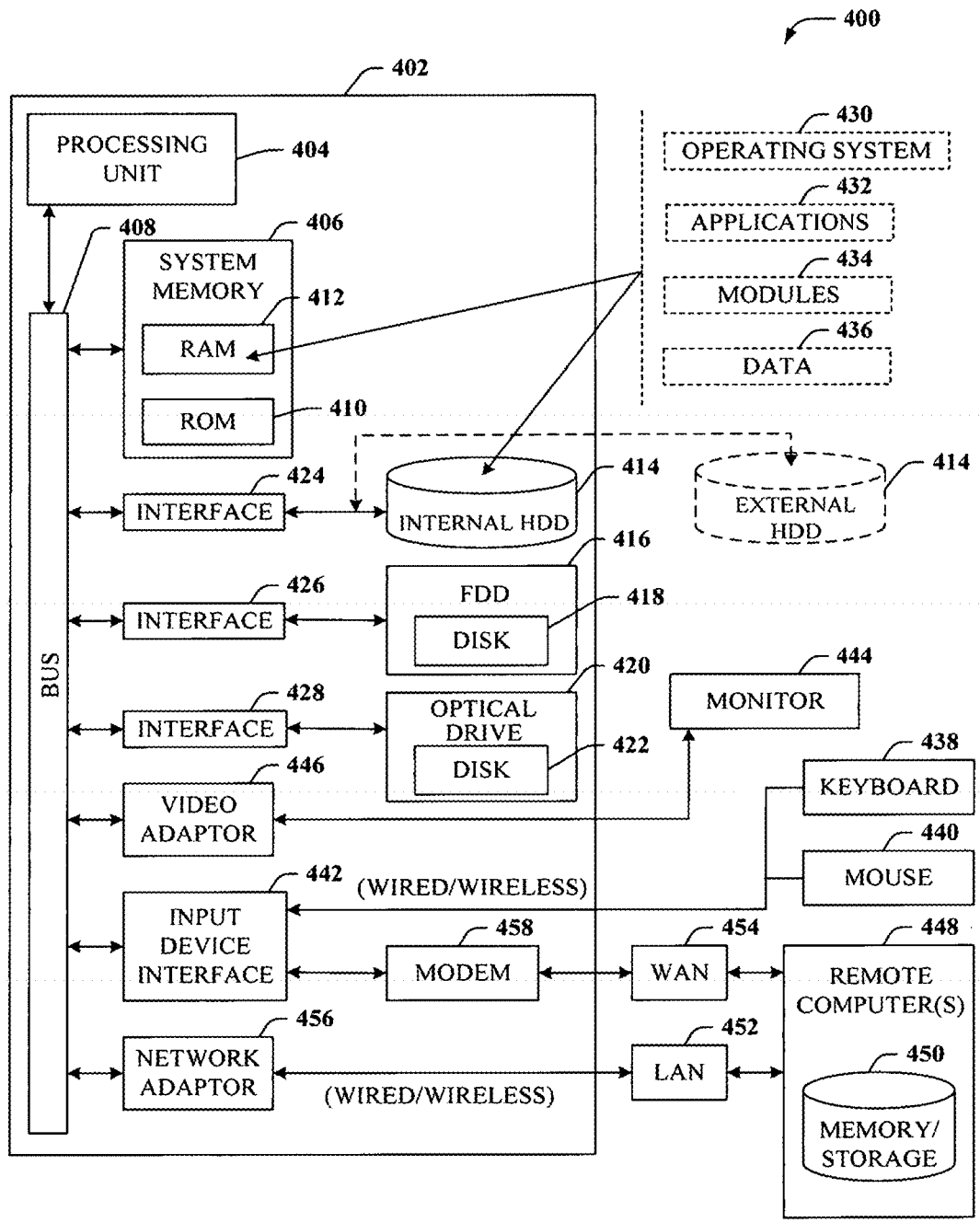
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 109, 301, access terminal 130, base station or access point 130, media terminal 106, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the computer system. The main memory and the processor also may constitute machine-readable media.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
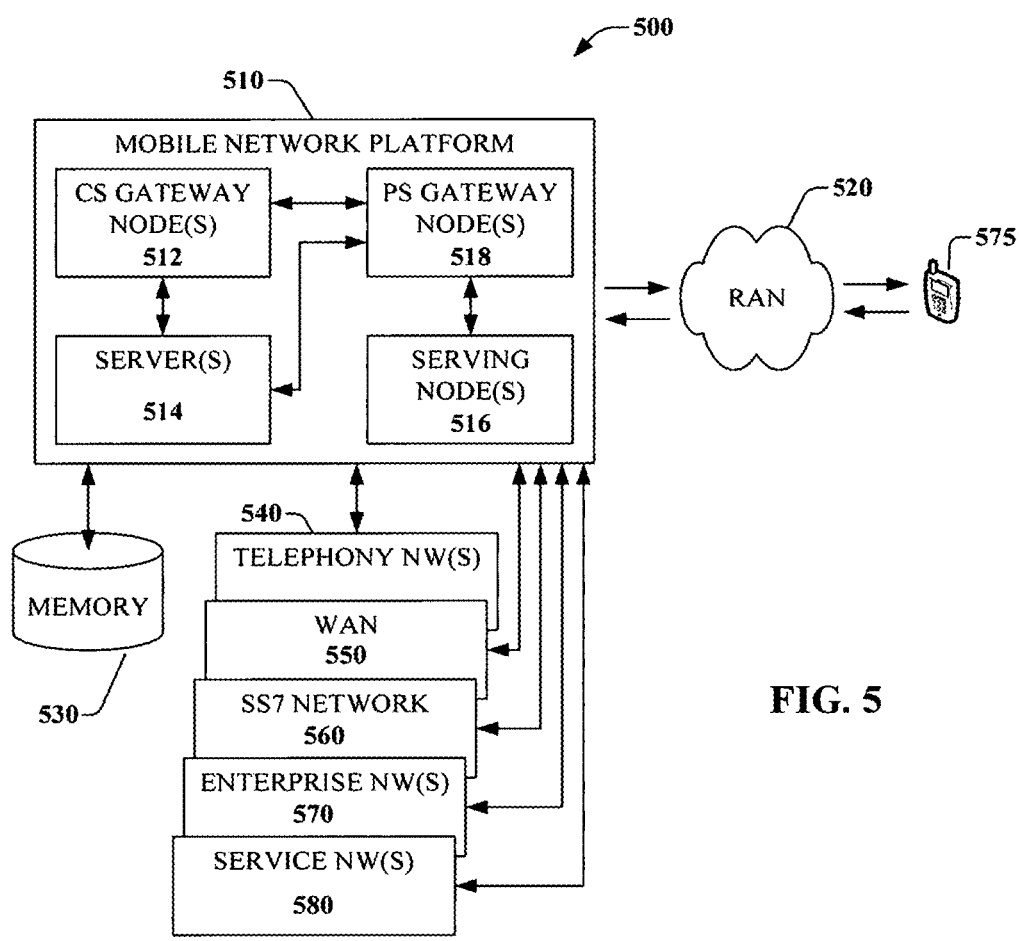
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points 130 such as base station or access point 130. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices 575. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) 210. Provisioning server(s) can also provision coverage through networks associated to wireless network platform 510 (e.g., deployed and operated by the same service provider), such as the distributed antennas networks that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices 575 served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
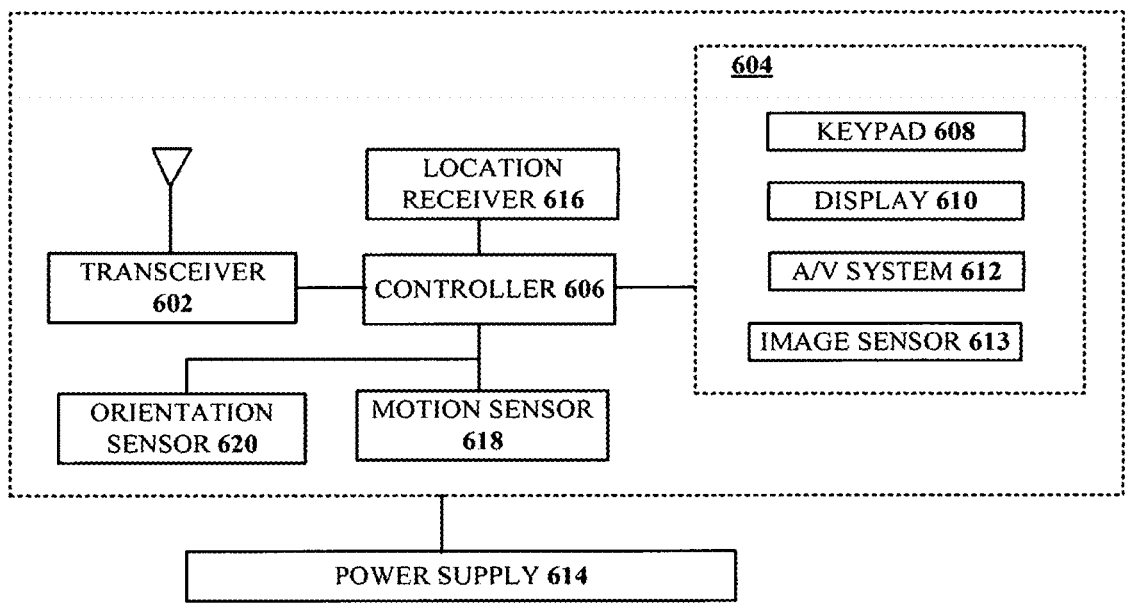
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as display device 100, mobile devices, display devices or other client devices for communication via either communications network.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points 130 by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Figure 7:
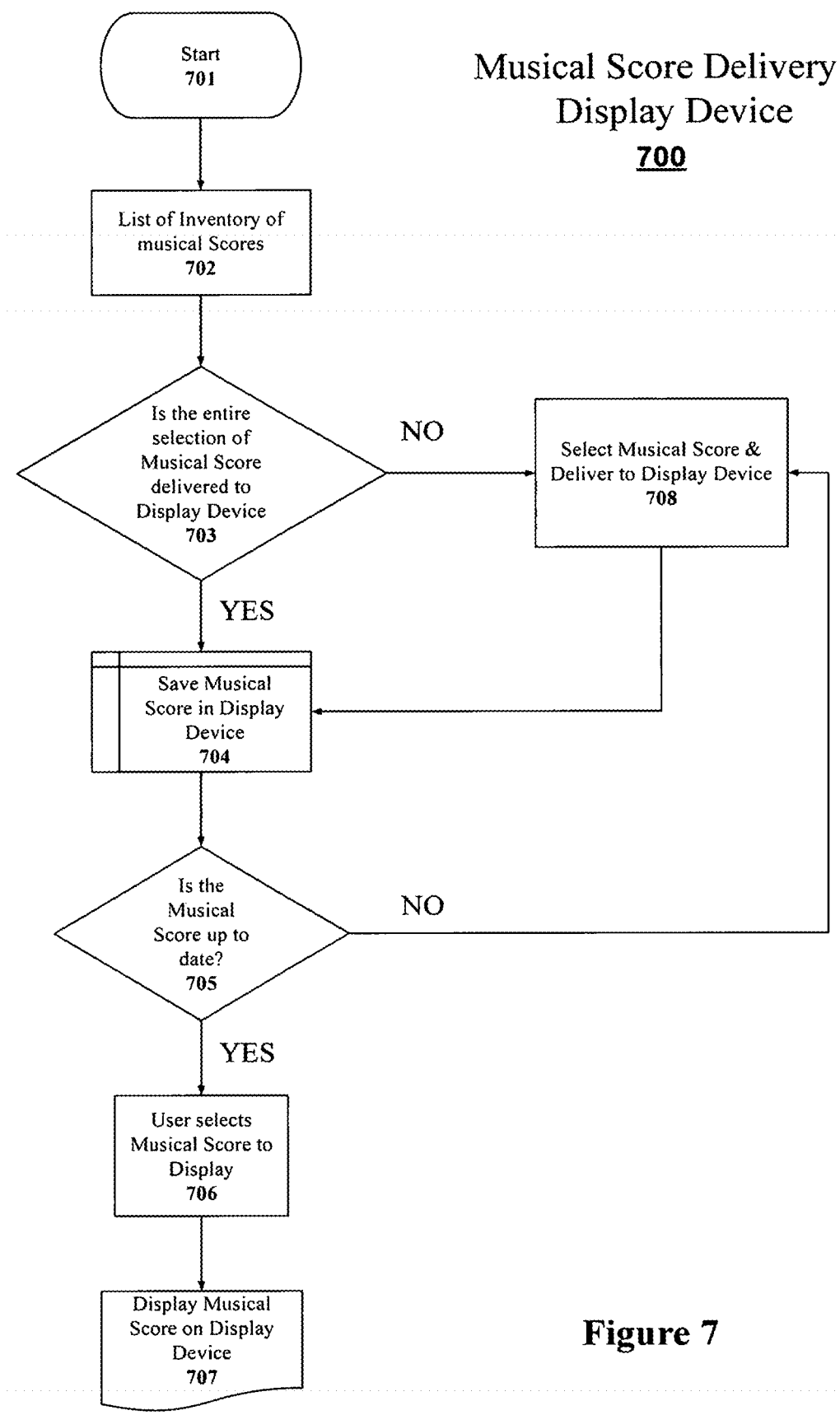
FIG. 7 is a block diagram of an example, non-limiting embodiment of a computing logic and environment in accordance with various aspects described herein.

Now referring to FIG. 7, an exemplary embodiment providing flow chart and instructions 700 are provided to deliver a musical score 110 to a display device 100 from a server 107 or a conductor's device 106 or a cloud server storing a myriad of musical scores 110. Such a cloud service could be a subscription-based service that delivers musical score 110 to any number of locations and subscribers across the globe, either directly or via the conductor's device 106 or a local server 107. The document (musical score 110) delivery 700 begins 701 with a list of musical scores 701 available for the user to select from. The method then looks to see if the entire selection of musical scores (presumably available to this user) 703 have been delivered to the user's Display Device 100. If the entire selection has not been delivered for a particular session, or period, or semester or year, then the user is asked to select the musical scores 110 needed for the session 708. On the other hand, if the entire list of musical scores 100 has been delivered, the display device 100 is asked to save and store 704 the selected scores 110 at the user's display device 100. Often, the musical scores are updated for a particular dynamic contemplated by the conductor. Thus, notations or changes 112 are made to the musical score 110. The display device then asks the user if the musical 110 score is up to date as required by the conductor. A marker may be provided by the conductor which indicates the version of the delivered musical score 110. If it is the wrong version, a request is made to select the correct version 708. The correct version is then delivered to the display device 100 and asked to save and store 704. On the other hand, if the correct version was delivered to begin with, the user may then simply select to display and playback the musical score 110 which is displayed 707 on the device 100. Playback may mean that a marker proceeds along each displayed note or a larger version of the musical score maybe provided and the document scrolls along the display in horizontal and/or vertical manner depending on if the portrait mode or landscape mode is selected on the device for display of the musical score 110. Each user may select their own preference which may be dependent on the musical instrument, whether in a marching band or orchestra or other setting. This disclosure does not limit the user to a particular setting for displaying the musical scores 110.

Figure 8:
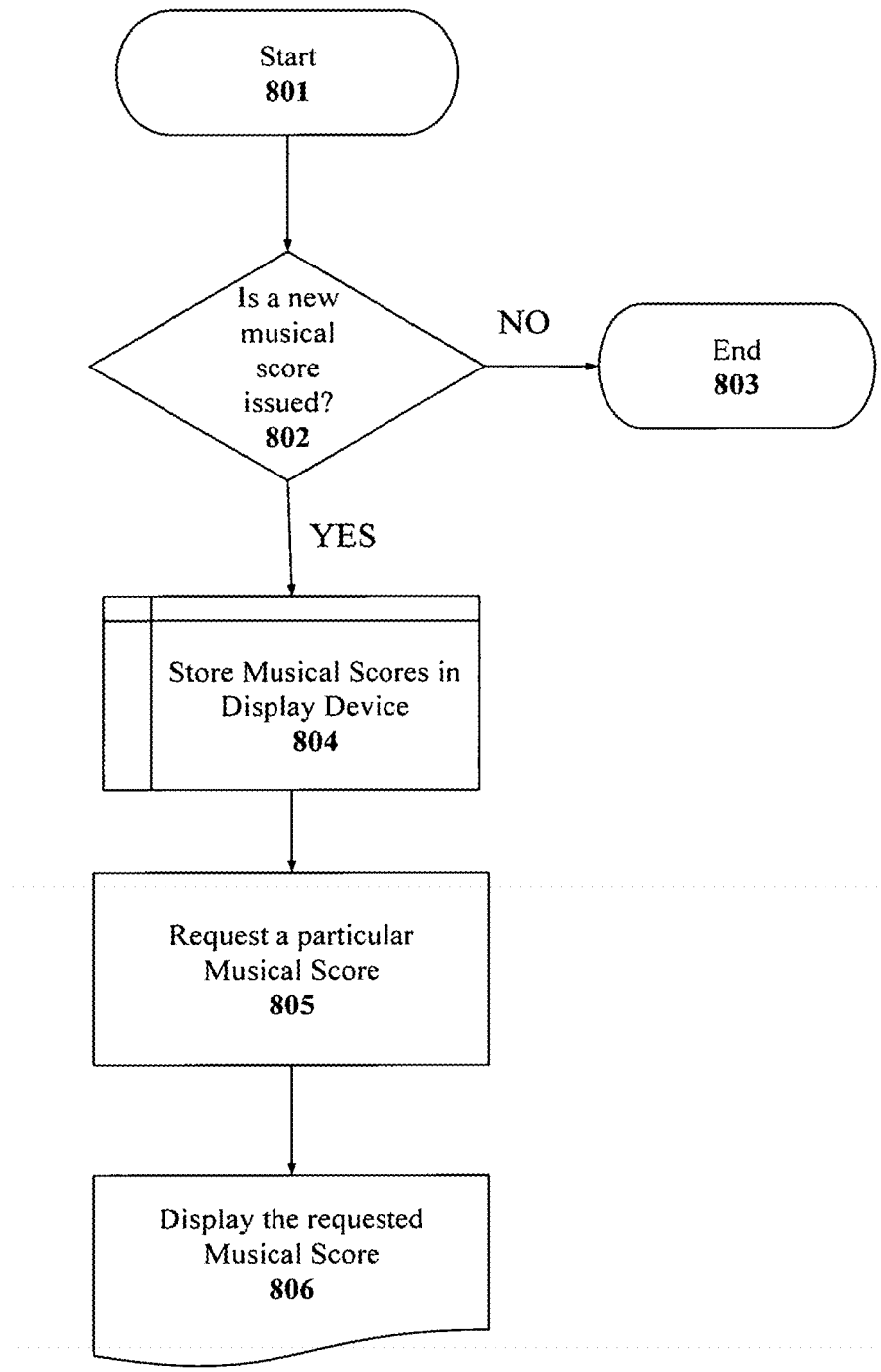
FIG. 8 is a block diagram of an example, non-limiting embodiment of a computing logic and environment in accordance with various aspects described herein.

Now referring to FIG. 8, an illustration is disclosed on one exemplary embodiment providing methodology and logic 800 to issuing and delivering a new or additional musical scores 110 to the end user's device 100. To begin with, the process begins 801, with asking the user to verify if new versions or additional musical scores 110 have been issued 802 for a device 100 download. If the new version or additional score or material is not available from the server 107 or conductor's device 106, the process ends 803. If new or additional versions of score or other materials are issued, then the device 110 is asked to store and save the new scores 110, or additional materials 804. Once the scores 110 or other materials are delivered and stored 804, they may be requested on demand by the user (player) 805 and displayed 806 on the display 113 of the display device 100.

Figure 9:
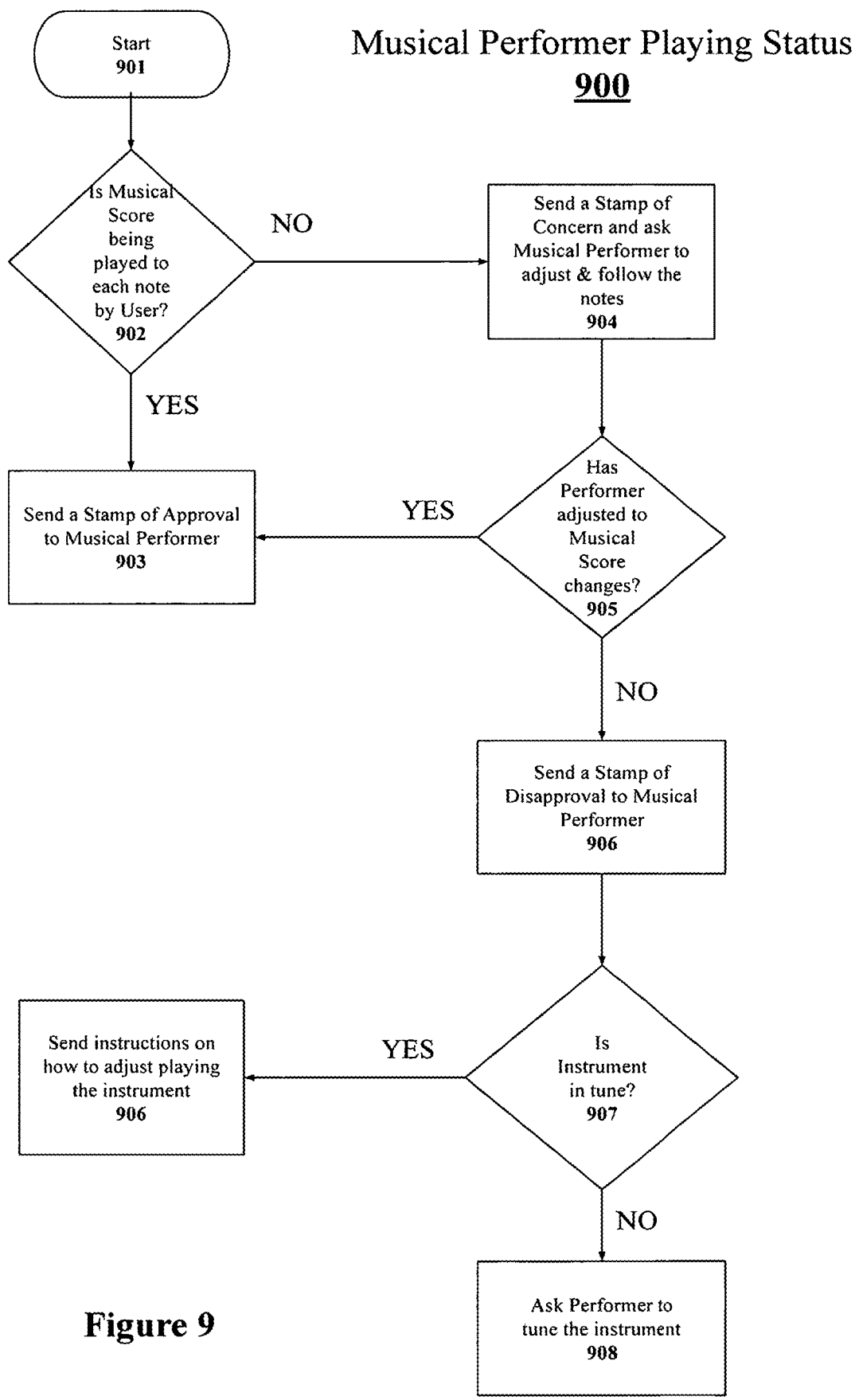
FIG. 9 is a block diagram of an example, non-limiting embodiment of a computing logic and environment in accordance with various aspects described herein.

Now referring to FIG. 9, an illustration and exemplary embodiment with logic 900 is disclosed with flow charts on an exemplary methodology providing the user feedback on the user's quality of playing the instrument or other forms of feedback to the user. This feedback may be provided live during a performance or at practice time. The feedback begins 901 with determining if the user is playing the instrument correctly 902 to each note being displayed on the musical score 110. If the notes are being played correctly, an indicator of some sort is provided on the display device 100 indicating a stamp of approval 903. The approval may be provided in any number of forms available to each system. One example is a green light 116 being displayed on the display 113. The indicator may in other forms such as highlighting the score 110 in ways that provide a stamp of approval 903. If the user (player) is not playing the notes correctly as required by the conductor, a warning 904 is provided on the display 113 or on the score 110 or another place on the device 100. The warning may be a stamp of disapproval 904 in the form a red light 116 or other such means. When the player adjusts his or her play of the musical instrument and made changes, a stamp of approval 905 is sent in the form a green light 116 or other such indicator. If the player continues to perform poorly, another indicator 906 is sent to the user in the form a red light 116 or another warning type. Thereafter, the logic may carry out an instrument tune check 907 and ask the player if the instrument is in tune 907. If it is in tune, then further guidance 908 may be provided by the conductor or an AI engine to the player. Because the orchestra or marching band is usually a large number of players, AI monitoring is particularly useful to provide guidance to a large number of users. If the instrument is out of tune 909 which may be detected by the microphone in the display device 100 and ask the player to tune the instrument 909. A microphone is very powerful tool to determine if the instrument is in tune, or alternately to determine if the correct notes are being played at the required time. These processes maybe tracked by an AI engine as described herein.

Figure 10:
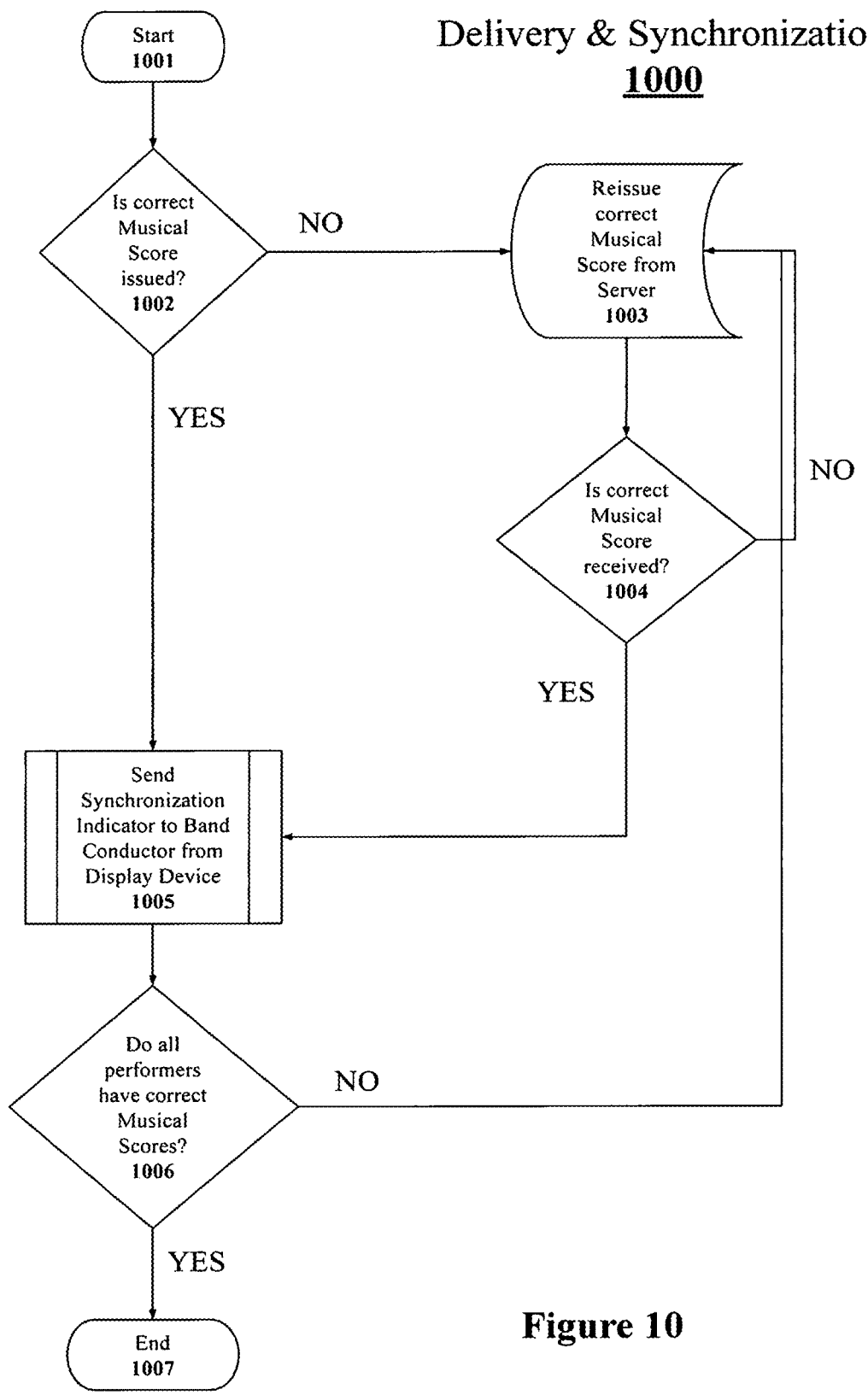
FIG. 10 is a block diagram of an example, non-limiting embodiment of a computing logic and environment in accordance with various aspects described herein.

Now, referring to FIG. 10, instructions and logic are provided for any exemplary embodiment teaching methods of delivery of documents 1000 (musical scores 110) or other guidance or documents to the end user device 100. The process begins 1001 by asking if a new score has been issued by the conductor 1002. If a new score 110 is issued and sent to the device 100, a synchronization instruction is sent between the band or orchestra conductor or assistant and the musician player (user) 1005 indicating the player the all synched with the conductor and ready to play. If the correct score is not received by the user, an instruction 1003 is sent to the server or other storage device where the inventory of scores are stored to issue or reissue a correct musical score 110. The system then asks if the reissued score 110 has been received by the user 1004. If not received, it is instructed to reissued again 1003. Once the score 110 has been received by the user, a synchronization request is made 1005. Once all users are synched and all users have received the correct scores 1006, the process ends 1007. If not, the process asks to reissue 1003 the correct documents 110 and the processes described above are once run.

As can be understood by those skilled in the art, variations may be made to add to these processes to add new features or processes. There is no one single method to accomplish these tasks, and these exemplary instructions may be arranged in a myriad ways as one skilled in the art understands.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RANI (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. Section 1.72(b), requiring an abstract that will allow the display to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A lightweight device comprising:
   a display;
   a microphone;
   a processing system including a processor; and
   a memory that stores executable instructions that, when executed by the processing system, facilitate performance of operations of the lightweight device, the operations comprising:
   displaying feedback on the display in response to an audible sound captured from a musical instrument near the lightweight device during a first timeframe associated with playback of a musical score received by the lightweight device, wherein the feedback includes a musical score annotation, and wherein the feedback is presented on the display after an analysis of the audible sound is received from a conductor's computing device or a server;
   and
   receiving further feedback at the lightweight device in the form of a live grading of a user's ability to play the musical instrument as intended in the musical score from a conductor's computing device based on an analysis of the audible sound, wherein the further feedback is associated with a second timeframe in the playback of the musical score, and wherein the second timeframe is subsequent to the first timeframe in the playback of the musical score;
   receiving an input at the lightweight device responsive to a determination that a guidance feature is enabled with respect to the musical score;
   determining a location of the lightweight device using a global positioning system (GPS) receiver in the lightweight device in communication with a satellite or a drone;
   determining a time and a date, wherein the input includes the location, the time, and the date; and
   issuing an instruction to the lightweight device and displayed on the display to have the user possessing the lightweight device take corrective action; wherein such instruction is issued using an artificial intelligence neural network to correct the position of the user possessing the lightweight device in a marching band formation with respect to other band members, or as mapped out and stored in the server, while comparing the user's lightweight device location with the other band members' respective lightweight devices' locations using the GPS receiver in each such lightweight device in communication with the satellite or the drone.

2. A non-transitory machine-readable medium, comprising executable instructions that, when executed by a processing system, including a processor, facilitate performance of operations via a lightweight device, the operation comprising:
   receiving at least a portion of a musical score at the lightweight device having a display;
   transmitting information from the lightweight device to a server or a conductor's device in response to a playback of musical score during a first timeframe of the playback of the musical score, wherein the information provides GPS coordinates identifying a near-exact location of the lightweight device being used by a user, and wherein the GPS coordinates are obtained by the lightweight device via signals received from a GPS communications system with a satellite or a drone; and receiving the guidance information at the lightweight device from the server or the conductor's computing device, wherein the guidance information includes navigation information for enhancing a user's navigation possessing the lightweight device during a marching band performance, wherein the guidance information includes an icon momentarily overlaid on the musical score, wherein the icon provides a navigation direction, a navigation speed, or a combination thereof to the user of the lightweight device, to arrive at a scene, an object, a location, or a combination thereof, during a playback of the musical score, and wherein the icon identifies a navigation path to the scene, the object, the location, or the combination thereof.

3. The non-transitory machine-readable medium of claim 2, wherein the icon identifies the navigation direction and the navigation speed for each marching band member using an artificial neural network located at a conductor's computing device or a server.

4. The non-transitory machine-readable medium of claim 2, wherein the musical score includes a tag, wherein the tag identifies a second object included in the musical score, and wherein the operations further comprise:

based on the tag, identifying the second object as a selectable item on the display;

receiving a selection of the second object subsequent to identifying the second object as the selectable item on the display; and responsive to receiving the selection of the second object, performing at least one of:

presenting a new annotated musical score with the musical note changes on the display; and presenting the musical note changes with a highlighted marking on the display.

5. A method, comprising:

transmitting, by a processing system including a processor, first guidance information associated with a playback of a musical score to a user's lightweight device, the first guidance information including a first measure of musical performance;

receiving, via the processing system, feedback from the user's lightweight device, wherein the feedback is based on the first guidance information from the processing system; and transmitting, via the processing system, second guidance information associated with the playback of the musical score sheet to the user's lightweight device in accordance with the feedback, the second guidance information including a second measure of musical performance, wherein the second guidance information is different from the first guidance information, wherein the second guidance information includes a reference marker associated with a current position of the user having the lightweight device relative to another user having another lightweight device in a marching band, and wherein the second guidance information includes a navigation direction and a navigation speed relative to the reference marker to arrive at a scene on a marching field, an object on the marching field, a near-exact location of the user having the lightweight device on the field, or a combination thereof.

6. The method of claim 5, wherein the musical score includes a tag, wherein the tag identifies a second object included in the musical score, and wherein the method further comprises:

based on the tag, identifying the second object as a selectable item on the lightweight device;

receiving a selection of the second object subsequent to identifying the second object as the selectable item from the lightweight device; and responsive to receiving the selection of the second object, performing at least one of:

transmitting a new annotated musical score with the musical note changes to the lightweight device; and transmitting the musical note changes with a highlighted marking on the lightweight device.

7. The method of claim 5 for training an artificial neural network for musical notes recognition made by a musical instrument, the method comprising:

receiving, via processing circuitry, input data responsive to an example musical note performed by a user of the musical instrument;

generating, via the processing circuitry, a sequence of data blocks based on a cepstral analysis of the input data;

adjusting, via the processing circuitry and utilizing a matrix inversion, weight values corresponding to a number of neuron circuits of the artificial neural network when the number of the neuron circuits is equal to the number of the data blocks; and adjusting, via the processing circuitry and utilizing a least-squares estimation, the weight values when the number of the neuron circuits is not equal to the number of the data blocks.

8. The method of claim 5, comprising:

transmitting, by a processing system including a processor, third guidance information associated with a playback of a musical score the user's lightweight device wherein the third guidance information turns on a backside display on the lightweight device and presents a choreographed effect on the backside display in concert with other lightweight devices having backside displays located near the user of the lightweight device.

* * * * *